United States Patent
Kirk et al.

[15] 3,668,038
[45] June 6, 1972

[54] PROCESS FOR PREPARING A FLEXIBLE PACKAGING MATERIAL

[72] Inventors: Charles C. Kirk, Laurel; Thomas E. Ferington, Sandy Spring; Razmic S. Gregorian, Silver Spring, all of Md.

[73] Assignee: W. R. Grace & Co., New York, N.Y.

[22] Filed: Feb. 2, 1970

[21] Appl. No.: 12,493

Related U.S. Application Data

[62] Division of Ser. No. 692,240, Feb. 2, 1970, Pat. No. 3,539,437.

[52] U.S. Cl...............156/276, 156/280, 156/300, 156/315, 156/326, 161/162, 161/255, 117/29
[51] Int. Cl............................................B32b 33/00
[58] Field of Search.................156/276, 242, 228, 280, 299, 156/300, 303.1, 315, 326; 117/16–29; 260/875, 878, 888; 161/162, 165, 250, 254

[56] References Cited

UNITED STATES PATENTS

| | | | |
|---|---|---|---|
| 2,969,472 | 11/1960 | Stuart | 260/878 B |
| 3,522,036 | 7/1970 | Vest et al. | 260/878 B |
| 3,555,110 | 1/1971 | McConnell et al. | 260/878 B |

*Primary Examiner*—Carl D. Quarforth
*Assistant Examiner*—P. A. Nelson
*Attorney*—Charles L. Harness and Kenneth E. Prince

[57] ABSTRACT

This invention is directed to a process for preparing self-supporting laminate films having low permeability to gases and to the films prepared by said process, all as described hereinafter.

5 Claims, 4 Drawing Figures

PATENTED JUN 6 1972 3,668,038

Charles C. Kirk
Thomas E. Ferington
Razmic S. Gregorian
INVENTORS

BY Kenneth E. Prince

ATTORNEY

PROCESS FOR PREPARING A FLEXIBLE PACKAGING MATERIAL

CROSS REFERENCE TO RELATED APPLICATION

This is a divisional of application Ser. No. 692,240, filed 2 Feb. 1970, now U.S. Pat. No. 3,539,437.

This invention is in the laminating art including: (1) a process for preparing self-supporting laminate films having a low permeability to gases; and (2) the films prepared by said process.

In summary, this invention is directed to a process for preparing a flexible self-supporting laminate having a low permeability to gases comprising: (a) placing the first surface of a sheet of modified clay-like mineral filler having a first surface, a second surface, and a thickness of about 0.1–3.0 mils in surface-to-surface contact with a surface of a first sheet of a first flexible thermoplastic film, said film consisting essentially of a polymer selected from the group consisting of polyethylene and a blend of about 10–90 parts of polyethylene and about 90–10 parts of a copolymer of about 55–85 parts of ethylene and about 45–15 parts of vinyl acetate, the first sheet of said film having a thickness of about 1–5 mils; (b) while said sheets are in such contact, compressing the sheet of modified clay-like mineral filler and the sheet of thermoplastic film for about 5–120 sec. under a pressure of about 100–500 psig. while heating at a temperature above the softening point of said thermoplastic film, while said sheet of modified mineral and said sheet of thermoplastic film are retained in surface-to-surface contact, to bond the surface of the thermoplastic film to the first surface of the sheet of modified mineral; (c) releasing the pressure; and (d) recovering the thus formed laminate.

Figure 1:
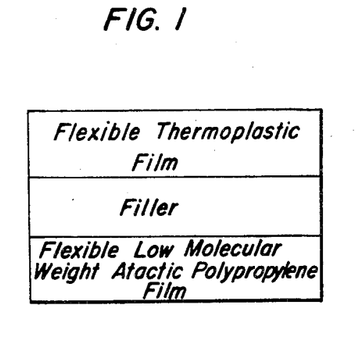
FIGS. 1–4 are schematic diagrams, or representations, of the laminates of this invention.
Figure 2:
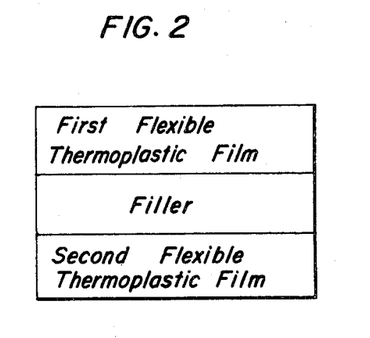
Figure 3:
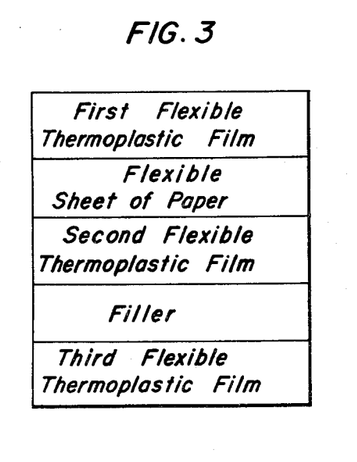
Figure 4:
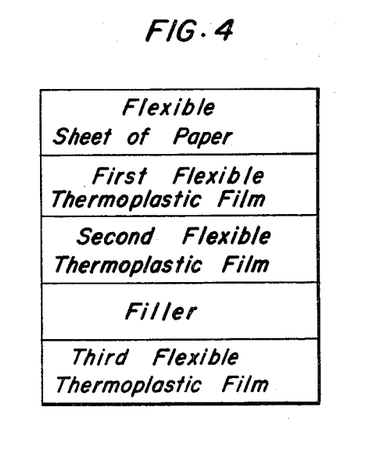

Preferred embodiments of this invention are directed to:

1. A process for preparing a flexible self-supporting laminate having a low permeability to gases comprising: (a) placing the first surface of a sheet of modified clay-like mineral filler having a first surface, a second surface, and a thickness of about 0.1–3.0 mils in surface-to-surface contact with a surface of a first sheet of a first fexible thermoplastic film, said film consisting essentially of a polymer selected from the group consisting of polyethylene and a blend of about 10–90 parts of polyethylene and about 90–10 parts of a copolymer of about 55-85 parts of ethylene and about 45–15 parts of vinyl acetate, the first sheet of said film having a thickness of about 1–5 mils; (b) while said sheets are in such contact, compressing the sheet of modified clay-like mineral and filler and the sheet of thermoplastic film for about 5–120 sec. under a pressure of about 100–500 psig. while heating at a temperature above the softening point of said thermoplastic film, while said sheet of modified mineral and said sheet of thermoplastic film are retained in surface-to-surface contact, to bond the surface of the thermoplastic film to the first surface of the sheet of modified mineral; (c) releasing the pressure; and (d) recovering the thus formed laminate—including embodiments in which;

i at least one coating of a solution of top coat material in an organic solvent is applied to the second surface of the sheet of modified clay-like mineral filler, and, after applying such coating; (a) adjusting the thickness of the coating of said top coat material solution; and (b) drying the coating of said solution to a solid state to form a film of said top coat material having a thickness of about 0.1–2 mils, said film of said material being bonded to the second surface of the sheet of clay-like mineral; and ii a surface of sheet of a second flexible thermoplastic film, said sheet of said second thermoplastic film having a thickness of about 1–5 mils, is placed in surface-to-surface contact with the second surface of the aforesaid sheet of modified clay-like mineral filler; and (a) while said sheets are in such contact compressing them for about 5–120 sec. under a pressure of about 100–500 psig. while heating at a temperature above the softening point of the second thermoplastic film;

2. A process for preparing a flexible self-supporting laminate having a low permeability to gases comprising: (a) placing the first surface of a sheet of modified clay-like mineral filler having a first surface, a second surface, and a thickness of about 0.1–3.0 mils in surface-to-surface contact with a surface of a first sheet of flexible thermoplastic film, said film consisting essentially of a polymer selected from the group consisting of polyethylene and a blend of about 90–10 parts of polyethylene and about 10–90 parts of copolymer of about 55–85 parts of ethylene and about 45–15 parts of vinyl acetate, said film having a thickness of about 1–5 mils; (b) while said sheets are in such contact placing the second surface of said sheet of modified clay-like mineral filler in surface-to-surface contact with a second sheet of a flexible thermoplastic film to form a sandwich comprising said sheet of modified clay-like mineral filler between the first and second sheets of flexible thermoplastic film, the first surface of said sheet of clay-like mineral being in face-to-face contact with a surface of the first sheet of flexible thermoplastic film and the second surface of said sheet of clay-like mineral being in face-to-face contact with a surface of the second sheet of flexible thermoplastic film; (c) compressing the sandwich for about 5–120 seconds under a pressure of about 100–500 psig. while heating said sandwich at a temperature above the softening point of said thermoplastic films; (d) releasing the pressure; and (e) recovering the thus formed laminate;

3. A process for preparing a self-supporting flexible laminate having a low permeability to gases comprising; (a) applying at least one coating of a dispersion of a modified clay-like mineral filler, said dispersion containing about 0.1–10 percent of said modified mineral, to a surface of a substrate comprising a sheet of flexible thermoplastic film, said film consisting essentially of a blend of about 10–90 parts of polyethylene and about 90–10 parts of a copolymer of about 80 parts of ethylene and about 20 parts of ethyl acrylate, said film having a thickness of about 1–5 mils; (b) adjusting the thickness of said coating to such thickness that, when subjected to a later-recited drying step, the coating will form a layer of said modified mineral having a thickness of about 0.01–0.08 mil; (c) drying said coating to form a layer of said modified mineral, adhering to the surface of the substrate, said layer having an exposed surface, and a thickness of about 0.01–0.08 mil; (d) applying at least one coating of a solution of top coat material in an organic solvent to the exposed surface of said layer; (e) adjusting the thickness of the coating of said solution of top coat material to such thickness that when subjected to a later-recited drying step, the coating will form a film of said material having a thickness of about 0.2–2.0 mils; (f) drying the coating of said solution to a solid state to form a film of said top coat material having a thickness of about 0.2–2.0 mils, said film of material being bonded to the layer of modified mineral; and (g) recovering the thus formed laminate;

4. A process for preparing a self-supporting flexible laminate having a low permeability to gases comprising; (a) applying at least one coating of a dispersion of a modified clay-like mineral filler, said dispersion containing about 0.1–10percent of said mineral to a surface of a substrate comprising a first sheet of a flexible thermoplastic film consisting essentially of a blend of about 10–90 parts of polyethylene and about 90–10 parts of a copolymer of about 80 parts ethylene and about 20 parts acrylic acid, said film having a thickness of about 1–5 mils; (b) adjusting the thickness of said coating to such thickness that, when subjected to a later-recited drying step, the coating will form a layer of said modified mineral having a thickness of about 0.01–0.08 mil; (c) drying said coating to form a layer of said modified mineral, said layer adhering to the surface of the substrate, said layer having one exposed surface and a thickness of 0.01–0.08 mil; (d) placing a surface of a second sheet of flexible thermoplastic film having a thickness of about 1-5 mils in surface-to-surface contact with the exposed surface of said layer to form a sandwich comprising the layer of modified mineral between the first and second sheets of flexible thermoplastic film; (e) compressing the sandwich for about 5-120 seconds under a pressure of about 100-500 psig. while heating said sandwich at a temperature above the softening point of the flexible thermoplastic film; (f) releasing the pressure; and (g) recovering the thus formed laminate; 5. A process for preparing a self-supporting flexible laminate having a low permeability to gases comprising; (a) applying a coating of a primer consisting essentially of an aqueous dispersion, said dispersion having a solids content of about 40-60percent, said solid consisting essentially of an ethylene-vinyl acetate copolymer, said copolymer consisting essentially of about 15-10 parts ethylene and about 85-90 parts vinyl acetate, to a surface of a sheet of paper, said paper having, before applying the primer thereto, a first uncoated surface and a second coated surface, the second coated surface being coated to a thickness of about 0.2-2 mils with a coating selected from the group consisting of (i) low density polyethylene, and (ii) a copolymer of about 80-90 parts of ethylene, about 5-10 parts zinc methacrylate, and about 4-10 parts of methacrylic acid, said paper having a thickness of about 2-20 mils, adjusting the thickness of the coating of a primer to a wet thickness that will yield a dry coating of said primer having a thickness, after a later-recited drying step of about 0.1-1 mil; (b) drying the aforesaid coating of primer, thereby to form a layer of dried primer adhering to a surface of said paper; (c) applying at least one coating of a dispersion of a modified clay-like mineral filler, said dispersion containing about 0.1-10 percent of said mineral to the thus dried coating of primer; (d) adjusting the thickness of said coating of said dispersion of mineral filler; (e) drying said coating of said dispersion of mineral, thereby to form a layer of modified clay-like mineral having a thickness of about 0.01-0.08 mil, said layer adhering to the aforesaid coating of dried primer; (f) applying at least one protective coating of the aforesaid aqueous dispersion of a copolymer of about 15-10 parts of ethylene and about 85-90 parts of vinyl acetate to the thus dried layer of clay-like mineral; (g) adjusting the thickness of said protective coating; (h) drying said protective coating thereby to form a dry protective film having thickness of about 0.1-1 mil over said dried layer of clay-like mineral; and (i) recovering the thus formed laminate--including embodiments in which, 1. the coating of primer is applied to the first uncoated surface of the sheet of paper; and
1. the coating of primer is applied to the second coated surface of the sheet of paper;

6. A process for preparing a self-supporting flexible laminate having a low permeability to gases comprising; (a) applying at least one first coating of a dispersion of modified clay-like mineral filler, said dispersion containing about 0.2-10 percent of said modified mineral, to a surface of a substrate comprising a sheet of flexible thermoplastic film, said film consisting essentially of a copolymer of about 80-90 parts of ethylene, 5-10 parts of zinc methacrylate, and about 4-10 parts of methacrylic acid, said substrate having a thickness of about 0.2-2.0 mils; (b) adjusting the thickness of the first coating; (c) drying the first coating to form a layer of said modified mineral filler adhering to the surface of the substrate, said layer of modified mineral filler having an exposed surface and a thickness of about 0.01-0.08 mil; (d) applying at least one second coating selected from the group consisting of dispersions and solutions of a copolymer consisting essentially of about 85-90 parts of vinylidene chloride and about 10 parts of methyl acrylate and about 5 parts of acrylonitrile to the exposed surface of the layer of mineral filler; (e) adjusting the thickness of the second coating; (f) drying the second coating of copolymer to a solid state to form a film of said copolymer having a thickness of about 0.2-2.0 mils, the thus formed film being bonded to the layer of mineral filler; and (g) recovering the thus formed laminate;

7. An article of manufacture (see FIG. 1) comprising a self-supporting laminate having a low permeability to gases, said laminate comprising; (a) a sheet of flexible thermoplastic film, said film consisting essentially of a blend of about 10-90 parts of polyethylene and about 90-10 parts of a copolymer of about 55-85 parts of ethylene and about 45-15 parts of vinyl acetate, said film having two surfaces and a thickness of about 0.5-5 mils; (b) a sheet of modified clay-like mineral filler having a thickness of about 0.1-3.0 mils, said sheet having a first surface and a second surface, the first surface of said sheet of modified mineral being bonded to a surface of the aforesaid thermoplastic film; and (c) a flexible film of low molecular weight atactic polypropylene, having two surfaces and a thickness of about 0.1-1.0 mil, one surface of said polypropylene film being bonded to the second surface of the sheet of modified clay-like mineral filler;

8. An article of manufacture (see FIG. 2) comprising a self-supporting laminate having a low permeability to gases, said laminate comprising; (a) a sheet of a first flexible thermoplastic film, said film consisting essentially of a blend of about 10-90 parts of polyethylene and about 90-10 parts of a copolymer of about 55-85 parts of ethylene and about 45-15 parts of vinyl acetate, said film having two surfaces and a thickness of about 0.5-5 mils; (b) a sheet of modified clay-like mineral filler having a thickness of about 0.01-0.08 mil, said sheet having a first surface and a second surface, the first surface of said sheet of modified mineral being bonded to a surface of the first thermoplastic film; and (c) a sheet of a second flexible thermoplastic film having two surfaces, and a thickness of about 0.5-5.0 mils, a surface of the sheet of said second thermoplastic film being bonded to the second surface of the sheet of modified mineral filler;

9. An article of manufacture (see FIG. 1) comprising a flexible self-supporting laminate having a low permeability to gases, said laminate comprising; (a) a sheet of flexible thermoplastic film, said film consisting essentially of a blend of about 10-90 parts of polyethylene and about 90-10 parts of a copolymer of about 80 parts of ethylene and about 20 parts of ethyl acrylate, said film having two surfaces and a thickness of about 0.5-5 mils; (b) a layer of modified clay-like mineral filler having a thickness of about 0.01-0.08 mil, said layer having a first surface and a second surface, the first surface of said layer adhering to a surface of said sheet of thermoplastic film; and (c) a flexible film of low molecular weight atactic polypropylene having two surfaces and a thickness of about 0.2-2.0 mils, a surface of said film of polypropylene being bonded to the second surface of said layer of modified mineral filler;

10. An article of manufacture (see FIG. 2) comprising a flexible self-supporting laminate having a low permeability to gases, said laminate comprising; (a) a sheet of first flexible thermoplastic film, said film consisting essentially of a blend of about 10-90 parts of polyethylene and about 90-10 parts of a copolymer of about 80 parts of ethylene and about 20 parts of acrylic acid, said film having two surfaces and a thickness of about 0.5-5 mils; (b) a layer of modified clay-like mineral filler having a first surface, a second surface and a thickness of about 0.01-0.08 mil, the first surface of said layer being bonded to the sheet of first thermoplastic film; and (c) a sheet of a second flexible thermoplastic film, said sheet of film having two surfaces and a thickness of about 0.5-5 mils, a surface of said second film being bonded to the second surface of the aforesaid layer of modified mineral filler;

11. An article of manufacture (see FIG. 3) comprising a flexible self-supporting laminate having a low permeability to gases, said laminate comprising; (a) a sheet of a first flexible thermoplastic film having a first surface, a second surface, and a thickness of about 0.5-5 mils, said first film consisting essentially of a copolymer of about 80-90 parts of ethylene, 5-10 parts of zinc methacrylate, and about 4-10 parts of methacrylic acid; (b) a flexible sheet of paper having a first surface, a second surface, and a thickness of about 2-20 mils, the first surface of said sheet of paper being bonded to the first surface of said first film; (c) a sheet of a second flexible thermoplastic film having a first surface, a second surface, and a thickness of about 0.2–2 mils, said second film consisting essentially of a copolymer of about 10–15 parts ethylene and 85–90 parts vinyl acetate, the first surface of said second film being bonded to the second surface of said sheet of paper; (d) a layer of modified clay-like mineral filler having a first surface, a second surface, and a thickness of about 0.01–0.08 mil, the first surface of said layer adhering to the second surface of the second film; and (e) a sheet of a third flexible thermoplastic film having a first surface, a second surface, and a thickness of about 0.1–5 mils, said third film consisting essentially of a copolymer of about 55–85 parts of ethylene and about 45–15 parts of vinyl acetate, the first surface of said sheet of third film being bonded to the second surface of said layer of modified clay-like mineral;

12. An article of manufacture (see FIG. 3) comprising a flexible self-supporting laminate having a low permeability to gases, said laminate comprising: (a) a sheet of a first flexible thermoplastic film having a first surface, a second surface, and a thickness of about 0.5–2 mils, said first film consisting essentially of a copolymer of about 80–90 parts of ethylene, 5–10 parts of zinc methacrylate, and about 4–10 parts of methacrylic acid; (b) a sheet of paper having a first surface, a second surface, and a thickness of about 2–20 mils, the first surface of said sheet of paper being bonded to the first surface of the sheet of first film; (c) a sheet of a second flexible thermoplastic film having a first surface, a second surface, and a thickness of about 0.5–5 mils, said second sheet of film consisting essentially of low density polyethylene, the first surface of said second film being bonded to the second surface of said sheet of paper; (d) a layer of modified clay-like mineral filler having a first surface, a second surface, and a thickness of about 0.0.01–0.08 mils, the first surface of said layer adhering to the second surface of the second film; and (c) a sheet of a third flexible thermoplastic film having a first surface, a second surface, and a thickness of about 0.1–5 mils, said third sheet of film consisting essentially of a copolymer of about 55–85 parts of ethylene and about 45–15 parts of vinyl acetate, the first surface of the sheet of third film being bonded to the second surface of said layer of modified clay-like mineral filler;

13. An article of manufacture (see FIG. 2) comprising a flexible self-supporting laminate having a low permeability to gases, said laminate comprising; (a) a sheet of a first flexible thermoplastic film having two surfaces and a thickness of about 0.5–5 mils, said first film consisting essentially of a copolymer of about 80–90 parts of ethylene, 5–10 parts of zinc methacrylate, and about 4–10 parts of methacrylic acid; (b) a layer of modified clay-like mineral filler having a first surface; a second surface, and a thickness of about 0.01–0.08 mil, the first surface of said layer adhering to one surface of the sheet of first film, and (c) a sheet of a second flexible thermoplastic film having two surfaces and a thickness of about 0.1–5.0 mils, said second film consisting essentially of a copolymer of about 75–95 parts of vinylidene chloride and about 25–5 parts of acrylonitrile and methyl acrylate, one surface of the sheet of second film adhering to the second surface of said layer of modified clay-like mineral filler; and 14. An article of manufacture (see FIG. 4) comprising a flexible self-supporting laminate having a low permeability to gases, said laminate comprising; (a) a sheet of paper having a first surface, a second surface, and a thickness of about 2–20 mils; (b) a sheet of a first flexible thermoplastic film having a first surface, a second surface, and a thickness of about 0.2–2 mils, said film consisting essentially of a polymer selected from the group consisting of (i) low density polyethylene, and (ii) a copolymer of about 80–90 parts of ethylene, about 5–10 parts zinc methacrylate, and about 4–10 parts of methacrylic acid, the first surface of said first film being bonded to the first surface of said sheet of paper; (c) a sheet of a second flexible thermoplastic film, said film having a first surface, a second surface and a thickness of about 0.1–1 mil, said second film consisting essentially of a copolymer of 10–15 parts ethylene and 85–90 parts vinyl acetate, the first surface of said second film being bonded to the second surface of the aforesaid first film; (d) a layer of modified clay-like mineral filler, said layer having a first surface, a second surface, and a thickness of about 0.01–0.08 mil, the first surface of said layer adhering to the second surface of the aforesaid second film; and (e) a sheet of a third flexible thermoplastic film, said film having a first surface, a second surface, and a thickness of about 0.1–1 mil, said film consisting essentially of a copolymer of about 10–15 parts ethylene and 85–90 parts vinyl acetate, the first surface of said third film adhering to the second surface of the aforesaid layer of filler.

The terms "modified clay-like mineral" and "modified clay-like mineral filler" as used herein mean a clay-like mineral having a platelike or platelet structure (i.e., an axial ratio of about 20–300:1) which has been treated to render such mineral substantially resistant to the hydrating and disintegrating action of water—including water vapor—thereby to make the modified clay-like mineral excellently adapted for use in the process of the instant invention, and for use as a component, or layer, in the laminate films of this invention, by rendering such laminate films, or laminates, substantially non-permeable to gases such as oxygen, nitrogen, air, water vapor, carbon dioxide and the like. The term "filler" as used herein also means at least one substance selected from the aforesaid modified clay-like minerals which, where present as a layer laminated, or bonded to a layer, or substrate, of polymer film—or as a layer laminated to or bonded between two layers of polymer film—will render such film substantially non-permeable to gases including those listed supra.

Since commercially available clay-like minerals contain impurities (such as silica, particles of rock, and some very large particles of clay-like minerals), it has been found that such minerals should be refined before using them in the process of this invention. Although many ways to accomplish such refining will be readily apparent to those skilled in the art, we prefer to do this by forming a suspension of about 0.1–10 percent of the clay-like mineral (preferably about 2 percent) in water, agitating the resulting mixture vigorously, and adding a small amount (0.1–5 percent based on the weight of the clay-like mineral present) of a dispersing and exfoliating agent such as sodium polyphosphate, sodium hydroxide, sodium carbonate, sodium oxalate, sodium phosphate, or the like to the resulting slurry, thereby to disperse and exfoliate the clay-like mineral. After thorough mixing we separate, for example by centrifuging or by decanting, the resulting dispersion (or slurry) from the few remaining large particles (including a small quantity of mineral which was not exfoliated).

Lithium treated vermiculite, or lithium modified vermiculite, (e.g., lithium treated vermiculite "paper") is a material excellently adapted for use in the process of the instant invention and as a component, or layer, in the laminates of said invention.

A preferred method for preparing a slurry, or dispersion or pulp of lithium modified vermiculite comprises:

a. Stirring biotite mineral ore (vermiculite mineral ore) in water to exfoliate and degrit it;

b. Separating the thus exfoliated mineral from the heavier contaminants by decantation, and recovering said mineral;

c. Adding the recovered mineral to a lithium chloride solution and thoroughly stirring the thus formed mixture;

d. Decanting the liquid (lithium chloride solution) from the lithium chloride-treated mineral and washing the thus treated mineral with several (e.g., 3–5) portions of water to remove water soluble salts from said mineral and recovering the washed lithium chloride-treated mineral; and c. Reducing the particle size of the lithium chloride treated mineral by diluting said mineral in a high shear blender (e.g., a Waring Blender or the like).

Other clay-like minerals can be lithium modified by treatment according to the above-described procedure substituting such minerals for vermiculite.

By lithium modified vermiculite paper is meant lithium modified vermiculite which has been formed into a sheet having a thickness of about 0.1–5 mils, preferably about 1.5–3 mils. A preferred method of preparing such modified vermiculite paper from lithium treated, or lithium modified vermiculite comprises:

a. Diluting a pulp, or dispersion, of lithium chloride-treated vermiculite to form a diluted pulp having a solid content of about 1 percent;
b. Flocculating the thus diluted pulp by adding a small amount of hydrochloric acid (e.g., ca 1.5 milliliters of 20 percent HCl solution per 100 milliliters of diluted pulp);
c. Forming a sheet of the acid-treated diluted pulp (e.g., (i) by spreading said diluted pulp on a screen, or porous surface; or (ii) by using a conventional paper making machine);
d. Drying the thus formed sheet by suction (i.e., vacuum) with or without the application of heat; and
e. Recovering the thus dried sheet of lithium chloride-treated (i.e., "lithium modified") vermiculite paper.

Other modified clay-like minerals can be converted into "-paper" or sheets having a thickness of about 0.1–5 mils preferably about 1.5–3 mils. A preferred method for preparing such sheets from modified clay-like mineral is to cast a layer of water-dispersed modified mineral on a smooth "wettable" surface. Dry in oven to remove water. Remove film for use or use in place if coated on a polymeric substrate.

Other preferred methods for treating clay-like minerals (e.g., vermiculite, mica, talc, or clay) having a platelike, or platelet structure (i.e., an axial ratio of about 20–300:1) to convert such minerals to modified clay-like minerals, or modified clay-like mineral fillers include cleaning or refining a clay-like mineral, as described supra, and:

1. Treating the clay-like mineral (e.g., vermiculite, mica, tac, or clay) with ions selected from at least one member of the group consisting of aluminum (III) and positive ions of transition elements. By transition elements is meant elements having atomic numbers 21–32, 39–51, and 57–83. It is generally preferred to use ions selected from the group consisting of iron(III), chromium (III), and zirconium(IV) ions. Optimum results have been obtained with chromium(III) and zirconium(IV) ions.

The dispersion is now ready for treatment with a solution of at least one salt of aluminum or a transition element, whereby the properties of the filler (especially its resistance to water vapor) are improved. We prefer to conduct such treatment by adding to the dispersion of clay-like mineral a solution of at least one salt of at least one element selected from the group consisting of aluminum and the transition elements, in which said element is present as a cation, while stirring the dispersion as the solution of said slat is added slowly thereto. The dispersion will take on a more and more flocculated character as the solution of said salt is added until flocculation is substantially complete. We then separate the clay-like mineral by a conventional method such as decantation, filtration, or centrifugation, and we wash the thus separated clay-like material to remove any salts and other impurities which are present in the mother liquor or adhering to the clay-like mineral.

In a modification of this method the clay-like mineral is treated with at least one ion selected from the group consisting of ions of aluminum and the transition elements by passing a dispersion, or slurry, of said mineral through an ion exchange column which has been prepared by passing a concentrated aqueous solution of at least one salt of at least one element selected from the group consisting of aluminum and the transition elements in which the aluminum or transition element is present as a cation through a column packed with a conventional hydrogen form of an ion exchange resin. For example, a solution of chromium(III) chloride can be passed through a column containing a conventional ion exchange resin in the hydrogen form, thereby to convert said resin from the hydrogen form to the chromium form. The dispersion of clay-like mineral is then passed through the ion exchange resin, and the thus treated clay-like mineral is recovered and washed. It has been found that passing the dispersion of clay-like mineral through a resin bed at a rate of about 0.005–0.3 bed volume per minute gives excellent results. We separate and wash the resulting modified clay-like mineral and redisperse the thus washed modified mineral to make a slurry suitable for use as a filler in certain embodiments of the process of our invention.

2. Treating a clay-like mineral (e.g., vermiculite, mica, or clay) with at least one organic quaternary ammonium compound, (e.g., a salt or base), having the formula wherein R, R′, R″, and R‴, are organic radicals selected from the group consisting of aliphatic radicals having 1–20 carbon atoms, R, R′, R″, and R‴ can all be identical, can all be different, or two or three of said radicals can be identical; A is an anion (e.g., chloride, bromide, fluoride, iodide, acetate, hydroxide—OH——, sulfate phosphate); $y$ is an integer equal (but opposite in sign) to the oxidation number (valence number) of anion A; for example, where A is chloride, iodide, hydroxide, or acetate, $y$ is 1, where A is sulfate, $y$ is 2 and where A is phosphate, $y$ is 3, thereby to form a modified (organic modified) clay-like mineral filler and to render the thus treated mineral, where used in the process of our invention, substantially resistant to the disintegrating action of moisture—including water vapor. In other words, this treatment (which we sometimes call "organic modification") of clay-like minerals having a platelike structure converts such minerals into excellent fillers for use in the process of the instant invention. We prefer to wash organic-modified minerals with water to remove water soluble impurities therefrom, thereby to further improve the moisture resistant characteristics of such modified minerals where used as fillers in the process of this invention.

Typical examples of quaternary ammonium compounds which gave excellent results when used to produce organic-modified minerals having a platelike structure are: tetramethyl ammonium iodide, tetraethyl ammonium chloride, tetrapropyl ammonium hydroxide, dimethyl dibutyl ammonium iodide, tributyl monomethyl ammonium acetate, dimethyl monoethyl dodecyl ammonium sulfate, methyl ethyl propyl butyl ammonium phosphate, Arguad 2C (dialkyl $C_{12}$, $C_{14}$ dimethyl quaternary ammonium chloride), Arquad 2HT (dialkyl $C_{16}$, $C_{18}$ dimethyl quaternary ammonium chloride), tetradecyl ammonium hydroxide, trimethyl monoalkyl ammonium chlorides where the alkyl radical other than the methyl radicals contains about 12–18 carbon atoms, dimethyl alkyl ammonium chlorides where the alkyl radical other than the methyl radicals contain about 8–18 carbon atoms. As a consequence of this disclosure, numerous other quaternary ammonium compounds suitable for use in the process of our invention will be readily apparent to those skilled in the art.

The quaternary ammonium compounds applied to dispersions of minerals having a platelike structure to produce modified clay-like minerals suitable for use as fillers in the process of this invention can be applied while dissolved in or suspended in (or partially dissolved and partially suspended in) media such as water, alcohols, halogenated hydrocarbons, hydrocarbons, tetrahydrofuran, mixtures thereof, and the like.

We have also found that the acid form of ion exchange resins can be treated with quaternary ammonium compounds, thereby to produce ion exchange resins in which at least a part of the hydrogen ions have been replaced by quaternary ammonium ions to form ion exchange resins which can be used to produce organic-modified clay-like minerals. Passing dispersions of clay-like minerals having platelike structures through columns containing such quaternary ammonium-treated ion exchange resins has produced organic modified clay-like minerals which make excellent fillers for use in the process of this invention.

We have found that modifying naturally occurring or synthetic minerals having a platelike structure (e.g., platy clays, vermiculite, and mica) by treating such minerals with quaternary ammonium compounds renders the thus formed organic-modified minerals having a platelike structure hydrophobic (organophilic). Accordingly, where applying a coating, or layer, of the thus modified mineral onto a plastic film for preparing the laminates of our invention we prefer to apply the modified mineral as a dispersion of such organic-modified mineral in an organic solvent or mixture of organic solvents rather than as a dispersion of such modified mineral in water. However, in one embodiment of our invention, we have applied coatings, or layers, of the thus treated minerals from aqueous dispersions thereof by incorporating a substantial quantity of a wetting agent selected from the group consisting of sodium lauryl sulfate, ammonium slats of alkyl acid phosphates, sodium alkyl sulfonates including sodium dodecyl benzene sulfonate, ammonium alkyl acid phosphate, and ammonium polystyrene sulfonate. Other wetting agents suitable for use in this embodiment of our invention will, as a consequence of this disclosure, be readily apparent to those skilled in the art.

Permeabilities of the laminate films prepared according to the procedure of this invention were determined according to the method of ASTM Designation: D 1434–63. The results are reported in units of:

$$\frac{cc}{atm \times M^2 \times day}$$

and $$\frac{cc \times mils}{atm \times M^2 \times day}$$

(Where the thickness of the laminate is considered.)

This invention will be further illustrated by the following examples which are illustrative only and which are not intended to limit the scope of the invention.

EXAMPLE 1

The first surface of a sheet of lithium modified vermiculite paper, prepared by the method set forth supra, said sheet of said vermiculite paper having a first surface and a second surface and a thickness of about 0.5 mil was placed in surface-to-surface contact with a first sheet of flexible thermoplastic film, said film being a blend of about 50 parts polyethylene and about 50 parts of a copolymer of about 55 parts ethylene and about 45 parts vinyl acetate, said film having a thickness of about 2 mils. The resulting first system comprising the modified vermiculite paper in surface-to-surface contact with the thermoplastic film was compressed at about 200 psig. for about 0.4 minute while heating at a temperature (ca. 260° F.) above the softening point of said film. The pressure was released and the resulting flexible self-supporting laminate (Laminate 1) was recovered and cooled to about room temperature. The permeability of Laminate 1 to oxygen gas was $4.1 \times 10^3$ cc. mil/atm. m² day.

EXAMPLE 2

The second surface of the lithium modified vermiculite paper comprising Laminate 1 was coated with a first coating of a solution of low molecular weight atactic polypropylene in a hydrocarbon solvent. The thickness of said first coating was adjusted to about 5 mils wet thickness, and said first coating was air dried. A second coating of said polypropylene solution was applied to the thus dried first coating. The thickness of said second coating was adjusted to about 5 mils wet thickness, and said second coating was, in turn, air dried, thereby to yield a laminate (Laminate 2) which was recovered. The permeability of Laminate 2 to oxygen was $3.0 \times 10^3$ cc. mil/atm. m² day.

EXAMPLE 3

A second sheet of the same film used in Example 1 was placed in surface-to-surface contact with the second surface of the lithium modified vermiculite paper comprising laminate 1, thereby to form a "sandwich" of said modified vermiculite paper between two sheets of said film. Said sandwich was compressed at about 200 psig. for about 0.4 minute at about 260° F. The pressure was released and the thus formed laminate (Laminate 3) was recovered and cooled. The permeability of Laminate 3 to oxygen was $1.7 \times 10^3$ cc. mil/atm. m² day.

EXAMPLE 4

A sheet of the aforesaid lithium modified vermiculite paper having a thickness of about 0.5 mil was placed between two sheets of flexible thermoplastic film of the type that was used in Examples 1 and 3 (said film having a thickness of about 2 mils and being taken from the same lot as the film used in Examples 1 and 3), thereby to form a sandwich of said modified vermiculite paper between two sheets of said film. Said sandwich was compressed at about 150 psig. for about 0.5 minute while heating at a temperature (ca. 255° F.) above the softening point of said film. The pressure was released and the resulting laminate (Laminate 4) was recovered and cooled. The permeability of Laminate 4 to oxygen was $1.7 \times 10^3$ cc. mil/atm. m² day.

EXAMPLE 5-A

A suspension of about 2 percent of bentonite clay in water at about 60° C. was agitated with rapid stirring and treated with sodium polyphosphate as a dispersing and exfoliating agent. About 0.5 sodium polyphosphate, based on the weight of the clay present, was added. When dispersion was substantially complete, after about 2 hours, stirring was discontinued and a small amount of larger unexfoliated clay particles and a few particles of rock, silica, and the like were allowed to settle out. The dispersion was decanted from the particles which had settled, thereby to obtain a dispersion of a purified clay-like material —purified bentonite clay. A one molar solution of chromium(III) chloride was slowly added to the suspension of purified clay while stirring said suspension. As the chromium salt was added, the clay flocculated slowly until flocculation of the clay was finally complete. The thus flocculated clay was separated from the supernatant liquor and washed with water, thereby to yield a modified clay suitable for use as a filler in the process of this invention. The thus washed modified clay was redispersed in an aqueous solution of sodium polyphosphate (about 8 percent sodium polyphosphate, based on the weight of the modified clay) and enough water to form a dispersion containing about 7 percent of the modified clay. The resulting dispersion of modified bentonite clay was labeled "Dispersion 5-A."

A coating of Dispersion 5-A was applied to the first surface of a sheet of flexible thermoplastic film, said film consisting essentially of a blend of about 25 parts of polyethylene and about 75 parts of a copolymer of about 80 parts of ethylene and about 20 parts of ethyl acrylate, said film having a first surface, a second surface, and a thickness of about 2 mils. The thickness of the wet coating of Dispersion 5-A was adjusted to such thickness that after a later recited drying step it would have a thickness of about 0.05 mil. The thus adjusted wet coating was air dried to yield a layer of chromium modified bentonite clay filler, said layer having a first surface and a second surface. The first surface of said layer being bonded to the first surface of the aforesaid sheet of flexible thermoplastic film. A first coating of a solution of low molecular weight atactic polypropylene was applied to the second surface of the layer of filler, and the thickness of said first coating was adjusted to about 5 mils wet thickness, and said first coating was air dried. A second coating of said polypropylene solution was applied to the thus dried first coating. The thickness of the second coating was adjusted to about 5 mils wet thickness, and the said second coating was air dried, thereby to yield a laminate (Laminate 5-A) which was recovered. The permeability of Laminate 5-A to oxygen was $0.53 \times 10^3$ cc. mil/atm. m² day.

EXAMPLE 5-B

A suspension of about 2 percent of bentonite clay in water at about 60° C. was agitated with rapid stirring and treated with sodium polyphosphate as a dispersing and exfoliating agent. About 0.5 percent sodium polyphosphate, based on the weight of the clay present, was added. When dispersion was substantially complete, after about 2 hours, stirring was discontinued and a small amount of larger unexfiliated clay particles and a few particles of rock, silica, and the like were allowed to settle out. The dispersion was decanted from the particles which had settled, thereby to obtain a dispersion of a refined, or purified, clay-like material—purified bentonite clay. The solid content of the slurry was adjusted to about 0.7 percent by adding water. A solution of Arquad 2C (a dialkyl $C_{12}$, $C_{14}$ dimethyl quaternary ammonium chloride in isopropyl alcohol and water) was added to the clay suspension. The suspension became more and more viscous as the quaternary salt was added until the "end point" was reached at which time the viscosity of the system began to decrease. A flocculant white precipitate settled out. This was recovered by filtration. The thus recovered organic-modified bentonite was washed twice with water to eliminate soluble impurities.

The thus washed material (organic-modified clay) was air-dried and then dried at about 120° C. until substantially free of water. This drying (at ca. 120° C.) required about an hour. The thus dried organic-modified clay was suspended in a mixture of tetrahydrofuran and carbon tetrachloride using about 4 parts of carbon tetrachloride to 1 part of tetrahydrofuran and a sufficient quantity of the organic-modified clay to produce a suspension having a solid content of about 2 percent; this dispersion, or suspension, was labeled "Dispersion 5-B."

A laminate (Laminate 5-B) was prepared by the general procedure used to prepare the aforesaid Laminate 5-A. However, in this invention the procedure was modified by using Dispersion 5-B in place of Dispersion 5-A which was used in the preparation of Laminate 5-A. The permeability of Laminate 5-B to oxygen was $1.3 \times 10^3$ cc. mil/atm. m² day.

EXAMPLE 6

A coating of the aforesaid DIspersion 5-A was applied to a surface of a sheet of a first flexible thermoplastic film, said film consisting essentially of a blend of about 60 parts of polyethylene and about 40 parts of a copolymer of about 80 parts ethylene and 20 parts acrylic acid, said film having a thickness of about 1 mil. The thickness of the wet coating of Dispersion 5-A was adjusted to such thickness that after a later recited drying step it would have a thickness of about 0.05 mil. The wet coating was air dried and then oven dried at about 70° C. for about 3 hours to yield a layer of modified mineral filler having a thickness of about 0.05 mil, said layer having a first surface and a second surface with said first surface adhering to a surface of the aforesaid first flexible thermoplastic film. A sheet of a second flexible thermoplastic film (a sheet from the same lot of film that was used in Example 1 supra) was placed in surface-to-surface contact with the second surface of said layer of modified mineral filler, thereby to form a sandwich comprising said layer of filler between the first film and the second film. The sandwich was compressed at about 200 psig. for about 0.75 minute at about 250° F. (a temperature above the softening point of the first and second films but below their melting points). The pressure was released, and the resulting laminate (Laminate 6) was recovered and cooled. The permeability of Laminate 6 to oxygen was $3.5 \times 10^3$ cc. mil/atm. m² day.

EXAMPLE 7

A first coating of a primer consisting essentially of an aqueous dispersion having a solid content of about 50 percent, said solids consisting essentially of an ethylene-vinyl acetate copolymer, said copolymer consisting essentially of about 15 parts ethylene and 85 parts vinyl acetate was applied to the first (uncoated) surface of a sheet of paper, said paper having, before applying the primer thereto, a first uncoated surface and a second coated surface, said second coated surface being coated with a coating of low density polyethylene, said sheet of paper having a thickness of about 5 mils. The thickness of the first coating of primer was adjusted to a wet thickness that (after a later recited drying step) it would yield a dry coating having a thickness of about 0.5 mil. The first coating of primer was air dried, thereby to form a layer of dried primer (copolymer of ethylene and vinyl acetate) adhering to the first surface of said sheet of paper. A coating of Dispersion 5-A was applied to the thus dried first coating of primer, and the thickness of the coating of Dispersion 5-A was so adjusted that said coating, after a later recited drying step, would form a layer of modified clay-like mineral filler having a thickness of about 0.07 mil. The coating of Dispersion 5-A was air dried, thereby forming a layer of said filler about 0.07 mil thick, said layer of filler having a first surface adhering to the aforesaid coating of dried primer and a second exposed surface. A protective coating of the aforesaid primer was applied to the exposed surface of said layer of filler, the thickness of the wet protective coating was adjusted, and the wet coating was air dried, thereby producing a protective covering of dried primer (copolymer of ethylene and polyvinyl acetate) adhering to second surface of the aforesaid layer of filler with the consequent production of a laminate (Laminate 7) which was recovered. The permeability of Laminate 7 to oxygen was about 11.2 cc./atm. m² day.

EXAMPLE 8

The general procedure of Example 7 was repeated using materials from the same lots that were used in said Example 7. However, in this instance the procedure was modified by applying the first coating of the aforesaid primer to the second coated surface of the sheet of paper. A coating of Dispersion 5-A was applied to the first coating of primer, after drying the primer, and a protective coating of said primer was applied to the layer of modified clay-like mineral filler formed by drying the coating of Dispersion 5-A. The protective coating of primer was dried, thereby to produce a laminate (Laminate 8) which was recovered. The permeability of Laminate 8 to oxygen was about 10.0 cc./atm. m² day.

EXAMPLE 9

A first coating of Dispersion 5-B was applied to the first surface of a sheet of film consisting essentially of a copolymer of about 85 parts ethylene, 5 parts zinc methacrylate, and about 10 parts methacrylic acid, said film having a thickness of about 1.5 mil. The thickness of the coating of Dispersion 5-B was adjusted and said coating was air dried. A second coating of Dispersion 5-B was applied to the thus dried first coating of said Dispersion 5-B. The thickness of the second coating was adjusted and said coating was air dried. A layer of organic-modified clay-like mineral filler having a thickness of about 0.06 mil, a first surface, and a second surface resulted from this treatment. The first surface of said layer of mineral filler adhered to the first surface of the aforesaid sheet of film. The second surface of said layer of mineral filler was exposed. A first coating of an aqueous dispersion of a copolymer consisting essentially of about 85 parts vinylidene chloride, about 10 parts of methyl acrylate, and about 5 parts of acrylonitrile was applied to the exposed surface of the layer of mineral filler. The thickness of this coating was adjusted and the coating was air dried. A second coating of said dispersion of said copolymer was applied to the thus dried first coating of said dispersion of copolymer. The thickness of the second coating of dispersion of copolymer was adjusted and the coating was air dried. A dry coating of said copolymer having a thickness of about 0.8 mil resulted from this treatment. The first surface of said dry coating adhered to the second surface of the aforesaid layer of modified clay-like mineral filler, thereby to form a laminate (Laminate 9). The permeability of Laminate 9 to oxygen was 14.9 cc./atm. m² day.

EXAMPLE 10

The general procedure of Example 1 was repeated. However, in this instance the procedure was modified by using a sheet of lithium modified vermiculite paper having a thickness of about 0.06 mil. The resulting laminate (Laminate 10) had an oxygen permeability of $5.0 \times 10^3$ cc. mil/atm. m² day.

EXAMPLE 11

The general procedure of Example 3 was repeated. However, in this instance the procedure was modified by substituting Laminate 10 for the laminate (Laminate 1) that was used in Example 3. The laminate formed from Laminate 10 was recovered and labeled "Laminate 11." The permeability of Laminate 11 to oxygen was $1.9 \times 10^3$ cc. mil/atm. m² day.

EXAMPLE 12

A sheet of paper having a thickness of about 5 mils, a first surface and a second surface, the first surface being bonded to the first surface of a first film, said first film having a thickness of about 1 mils and consisting essentially of a copolymer of about 80 parts ethylene, 10 parts of zinc methacrylate, and 10 parts methacrylic acid; said paper was coated on its second surface with a first coating consisting essentially of an aqueous dispersion having a solid content of about 55 percent, said solid consisting essentially of a copolymer about 85 parts vinyl acetate and 15 parts ethylene. The thickness of said first coating was adjusted and the first coating was air dried to produce a second film having a thickness of about 0.5 mils, a first surface, and a second surface with the first surface of said second film being bonded to the second surface of said sheet of paper. A second coating of Dispersion 5-A was applied to the second surface of said second film. The thickness of said second coating of Dispersion 5-A was adjusted, and said second coating was air dried, thereby to form a layer of a modified clay-like mineral filler, said layer having a thickness of about 0.06 mil, a first surface, and a second surface with the first surface of said layer of filler adhering to the second surface of the aforesaid second film. A third coating of the aforesaid aqueous dispersion of a copolymer of about 85 parts vinyl acetate and 15 parts ethylene was applied to the second surface of the aforesaid layer of modified clay-like mineral filler. The thickness of said third coating was adjusted, and said third coating was air dried, thereby to form a third film, said third film having a thickness of about 0.5 mils, a first surface, and a second surface with said first surface adhering to the second surface of the aforesaid layer of mineral filler. The resulting laminate was recovered and labeled "Laminate 12." The permeability of Laminate 12 to oxygen was about 10.8 cc./atm. m² day.

EXAMPLE 13

A first coating of Dispersion 5-A was applied to the second surface of a second film of low density polyethylene, said second film having a thickness of about 1 mil, a first surface and a second surface with the first surface bonded to the first surface of a flexible sheet of paper. Said sheet of paper had a thickness of about 5 mils, a first surface and a second surface with the second surface of said sheet of paper being bonded to the first surface of a first film. Said first film consisted essentially of a copolymer of about 85 parts ethylene, 10 parts zinc methacrylate, and 5 parts methacrylic acid. Said first film had a thickness of about 1 mil. The thickness of said first coating was adjusted (while the coating was wet) and the coating was air dried to yield a layer of modified clay-like mineral filler having a thickness of about 0.08 mil, a first surface and a second surface with the first surface of said layer adhering to the second surface of the aforesaid second film. On the first surface of said second film applied a second coating of an aqueous dispersion having a solid content of about 45 percent, the solids consisting essentially of a copolymer of about 15 percent ethylene and 85 percent vinyl acetate. The thickness of the second coating was adjusted (while the coating was wet) and the coating was air dried thereby to form a third film having a thickness of about 0.5 mils, a first surface, and a second surface with the first surface of said third film adhering to the second surface of the aforesaid layer of modified mineral filler. The resulting laminate was recovered and labeled "Laminate 13." The permeability of Laminate 13 to oxygen was 10.2 cc./atm. m² day.

EXAMPLE 14

(Control)

Six steel bolts (ca. ⅜ inch diameter and ca. 2¼ inches long) were sealed in a bag made of polyethylene (ca. 2 mils thick). The sealed bag was placed on a shelf in an open (non-air conditioned) shop and left there during the hot humid summer months (about 3½ months) under conditions of high relative humidity (up to at least 98 percent) and temperature ranging up to about 100° F. At the end of the summer the bag was opened and the bolts were removed and examined. All of the bolts had rusted.

EXAMPLE 15

The general procedure of Example 14 was repeated in fifteen (15) replications but modified by using a different bag in each replication; the bags were made from Laminates 1, 2, 3, 4, 5-A, 5-B, 6, 7, 8, 9, 10, 11, 12, 13, respectively.

All bolts tested in the instant example were free of evidence of rust when removed from the bags at the end of the test period.

EXAMPLE 16

(Control)

Fresh crisp (non-rancid) potato chips (about 6 ounces) were sealed in a bag made of polyethylene (ca. 2 mils thick). The sealed bag was placed on a shelf in a room having a northern exposure and left there for 6 weeks during the summer months. The room was not air conditioned and the relative humidity was high—reaching at least 98 percent. Temperature of the room ranged from about 70–100° F. during the test. At the end of the 6-week test period the bag was opened and the chips were examined and tasted. The potato chips had become soft and soggy and had developed a rancid flavor.

EXAMPLE 17

The general procedure of Example 16 was repeated in fifteen (15) replications but modified by using a different bag in each replication; the bags were made from Laminates 1, 2, 3, 4, 5-A, 5-B, 6, 7, 8, 9, 10, 11, 12, and 13, respectively.

All potato chips in the instant example were crisp and free of rancid taste when removed from the bags.

EXAMPLE 18

The first surface of a lithium vermiculite sheet of about 3.5 mils thickness was coated with a hydrocarbon solvent solution of polyvinyl chloride, said coating having a wet thickness of about 1 mil. The coating was dried under an infrared lamp and a second coating was identically applied. This double coating procedure was repeated on the second surface of the vermiculite paper and the resulting resin-coated vermiculite sheet had a permeability to oxygen substantially below those sheets which were only coated on one surface.

Self-supporting laminate films made by the process of this invention have been found to be excellently adapted for packaging foods which should (or must) be protected from contact with the atmosphere. Said laminate films are also excellently adapted for protecting objects (including metal objects) from contact with atmospheric oxygen, water vapor, smog, smog-like components, and the like.

Permeabilities reported in the above examples, unless it is stated otherwise where permeability data are reported, were determined with dry gases.

As used in the specification and claims of this application: (a) The term percent (%) means percent by weight unless otherwise defined where used; (b) The term cc. means cubic centimeters; (c) The term mil means 0.001 inch; (d) The term "atm" means atmosphere (i.e., 760 millimeters of mercury); (e) The term "psig" as used herein means pounds per square inch gauge pressure; and (f) The term "parts" as used herein means parts by weight unless otherwise defined where used.

As used herein the term "organic-modified clay-like mineral-filler" means an organic-modified clay-like mineral filler prepared from clay-like minerals having platelike, or platelet, structure, i.e., an axial ratio of about 20–300:1.

As used herein the term "softening point" means the temperature at which the surface of a thermoplastic material will begin to flow or will flow slightly if sufficient pressure (e.g., ca. 100–500 psig.) is applied. The term "melting point" means the temperature at which such material will flow freely (e.g., is free flowing) under the aforesaid pressure.

Permeabilities were measured according to the method of ASTM Designation: D 1434–63. All gas volumes were corrected to STP (i.e., 1 atmosphere and 0° C.).

By "low permeability to gas" is meant a permeability to oxygen of about $5 \times 10^3$ cc./atm. m$^2$ day. (The permeability of polyethylene film is about $7-10\times10^3$ cc./atm. m$^2$ day).

The thickness of wet coatings (e.g., coatings of dispersions of modified clay-like mineral fillers or dispersions of polymers) including those which are wet with water, with organic solvents, or with mixtures of water and organic solvents can be adjusted with a Meyer Bar, a Baker Film Applicator Bar, doctor bar or the like in a conventional manner.

It has been found that wet coating (including those which are wet with water, organic solvents, or mixtures thereof) can be air dried. This can be accomplished by exposing the wet coating to the atmosphere, to a stream of air, or to the atmosphere while applying heat (e.g., from heat generating electric lamps—the so-called heat lamps). Alternatively, a stream of air can be directed over the coating using care to avoid producing flow in the coating because such flow could change the thickness of the coating. The stream of air could be at room temperature or at an elevated temperature. Where using heated air any temperature can be used provided such temperature does not char, burn or otherwise damage the organic materials comprising the films present and providing the liquid components of the coating do not boil, thereby to produce pin holes in the coating or to adversely affect the continuousness of the coating. Drying ovens, kilns and the like can also be used providing the above-mentioned precautions are taken with respect to oven temperature.

As used herein, the term "top coat material" means a material selected from the group consisting of: (a) hydrocarbon solutions of , (i) polypropylene, (ii) polyvinyl chloride, and (iii) polyamides; (b) latexes selected from the group consisting of aqueous suspensions, aqueous dispensions, and aqueous emulsions of; (i) polyvinyl chloride, (ii) polyvinyl acetate, vinyl acrylic copolymers, and (c) melts selected from the group consisting of blends of two or more members selected from the group consisting of; (i) polyethylene, (ii) polyvinyl acetate (iii) polypropylene; (iv) nylon; and (v) paraffin wax.

Organic solvents excellently adapted for use in preparing solutions of polypropylene, polyvinyl chloride, and polyamides include xylene, toluene, benzene, cyclohexane, acetone, tetrahydrofuran, dimethylformamide, and dimethylsulfoxide. Other organic solvents which are well suited for this use will, on the basis of our disclosure, be readily apparent to those skilled in the art.

What is claimed is:
1. A process for preparing a flexible self-supporting laminate useful for packaging materials, comprising:
a. placing a surface of a sheet of mineral filler material having two surfaces, a thickness of about 0.1–3 mils, and being selected from the group of minerals consisting of vermiculite, mica, talc, and clay having an axial ratio of about 20–300:1, said mineral filler material having been modified by a process comprising contacting an aqueous dispersion of said mineral with a member selected from the group consisting of: (i) an aqueous solution of ions selected from the group consisting of lithium ions, aluminum ions, and ions of an element having an atomic number of 21–32, 39–51, or 57–83; and (ii) an aqueous solution or an aqueous suspension of at least one organic quaternary ammonium compound having the formula wherein R, R', R'', and R''', are organic radicals selected from the group consisting of aliphatic radicals having 1–20 carbon atoms, A is an anion selected from the group consisting of chloride, bromide, fluoride, iodide, acetate, hydroxide, phosphate, and sulfate; and y is an integer equal to, but opposite in sign to the oxidation number of said anion A, in surface-to-surface contact with a surface of a sheet of a flexible thermoplastic film, said film consisting of polyethylene or a blend of about 10–90 parts of polyethylene and about 90–10 parts of a copolymer of about 55–85 parts of ethylene and about 45–15 parts of vinyl acetate, said sheet of said thermoplastic film having a thickness of about 1–5 mils;
b. compressing the sheet of said modified mineral filler material and the sheet of thermoplastic film for about 5–120 seconds under a pressure of about 100–500 psig. while heating said sheets at a temperature above the softening point of said thermoplastic film, while said sheets are retained in surface-to-surface contact, to bond the sheet of thermoplastic film to the surface of the sheet of said modified mineral filler material;
c. releasing the pressure; and
d. recovering the thus formed laminate.

2. A process for preparing a flexible self-supporting laminate useful for packaging materials, comprising:
a. placing the first surface of a sheet of mineral filler material having a first surface, a second surface, and a thickness of about 0.1–3 mils, said mineral filler material being selected from the group of minerals consisting of vermiculite, mica, talc, and clay having an axial ratio of about 20–300:1, said mineral filler having been modified by a process comprising contacting an aqueous dispersion of said mineral with a member selected from the group consisting of: (i) an aqueous solution of ions selected from the group consisting of lithium ions, aluminum ions, and ions of an element having an atomic number of 21–32, 39–51, or 57–83; and (ii) an aqueous solution or an aqueous suspension of at least one organic quaternary ammonium compound having the formula wherein R, R', R", and R''', are organic radicals selected from the group consisting of aliphatic radicals having 1-20 carbon atoms, A is an anion selected from the group consisting of chloride, bromide, fluoride, iodide, acetate, hydroxide, phosphate, and sulfate; and $y$ is an equal to, but opposite in sign to the oxidation number of said anion A in surface-to-surface contact with a surface of a sheet of a flexible thermoplastic film, said film consisting of polyethylene or a blend of about 10-90 parts of polyethylene and about 90-10 parts of a copolymer of about 55-85 parts of ethylene and about 45-15 parts of vinyl acetate, said sheet of said thermoplastic film having a thickness of about 1-5 mils;

b. compressing the sheet of said modified mineral filler material and the sheet of thermoplastic film for about 5-120 seconds under a pressure of about 100-500 psig. while heating said sheets at a temperature above the softening point of said thermoplastic film, while said sheets are retained in surface-to-surface contact; to bond the surface of the sheet of thermoplastic film to the surface of the sheet of said modified mineral filler material;

c. releasing the pressure;

d. applying a coating of a top coat material selected from the group consisting of; (i) polypropylene and polyvinyl chloride, in an organic solvent selected from the group consisting of xylene, toluene, benzene, and cyclohexane; and (ii) latexes selected from the group consisting of aqueous suspensions, aqueous dispersions, and aqueous emulsions of polyvinyl chloride, polyvinyl acetate, vinyl acrylic copolymers;

e. adjusting the thickness of the coating of said top coat material; and f. drying the coating of said solution of top coat material to a solid state to form a film of said top coat material having a thickness of about 0.1-2 mils, said film of said top coat material being bonded to the second surface of the sheet of modified mineral filler material.

3. A process for preparing a flexible self-supporting laminate useful for packaging materials, comprising:

a. placing the first surface of a sheet of modified mineral filler material having a first surface and a second surface, a thickness of about 0.1-3 mils, and being selected from the group of minerals consisting of vermiculite, mica, talc, and clay having an axial ratio of about 20-300:1, said mineral filler having been modified by a process comprising contacting an aqueous dispersion of said mineral with a member selected from the group consisting of: (i) an aqueous solution of ions selected from the group consisting of lithium ions, aluminum ions, and ions of an element having an atomic number of 21-32, 39-51, or 57-83; and (ii) an aqueous solution or an aqueous suspension of at least one organic quaternary ammonium compound having the formula wherein R, R', R", and R''', are organic radicals selected from the group consisting of aliphatic radicals having 1-20 carbon atoms, A is an anion selected from the group consisting of chloride, bromide, fluoride, iodide, acetate, hydroxide, phosphate, and sulfate; and $y$ is an integer equal to, but opposite in sign to the oxidation number of said anion A in surface-to-surface contact with a surface of a first sheet of flexible thermoplastic film, said film consisting of polyethylene or a blend of about 10-90 parts of polyethylene and about 90-10 parts of a copolymer of about 55-85 parts of ethylene and about 45-15 parts of vinyl acetate, said sheet of said thermoplastic film having a thickness of about 1-5 mils;

b. compressing the sheet of said modified mineral filler material and the sheet of thermoplastic film for about 5-120 seconds under a pressure of about 100-500 psig. while heating said sheets at a temperature above the softening point of said thermoplastic film, while said sheets are retained in surface-so-surface contact, to bond the surface of the sheet of thermoplastic film to the surface of the sheet of said modified mineral filler material;

c. releasing the pressure;

d. placing the second surface of said sheet of said modified mineral filler material in surface-to-surface contact with a surface of a second sheet of flexible thermoplastic film consisting of: (i) a blend of about 10-90 parts polyethylene and about 90-10 parts of a copolymer of abut 55-85 parts of ethylene and about 45-15 parts of vinyl acetate; (ii) a blend of about 10-90 parts of polyethylene and about 90-10 parts of a copolymer of about 80 parts of ethylene and about 20 parts of ethyl acrylate;(iii) a copolymer of about 80-90 parts ethylene, about 5-10 parts zinc methacrylate, and about 4-10 parts of methacrylic acid; (iv) a copolymer of about 15-10 parts ethylene and about 85-90 parts vinyl acetate; (v) low molecular weight atactic polypropylene; (vi) a copolymer of about 55-85 parts of ethylene and about 45-15 parts of vinyl acetate; and (vii) low density polyethylene, said second film having a thickness of about 0.5-5 mils, to form a sandwich comprising the sheet of modified mineral filler material between said first thermoplastic film and said second thermoplastic film;

e. compressing said sandwich under a pressure of about 100-500 psig. while heating said sandwich at a temperature above the softening point of said second thermoplastic film, while said sandwich is retained under said pressure, to bond the surface of sheet of said second thermoplastic film to the second surface of the sheet of said modified mineral filler material;

f. releasing the pressure; and g. recovering the resulting laminate.

4. A process for preparing a flexible self-supporting laminate useful for packaging materials, comprising:

a. placing the first surface of a sheet of a modified mineral filler material selected from the group of minerals consisting of vermiculite, mica, talc, and clay having an axial ratio of about 20-300:1, said mineral filler material having been modified by a process comprising contacting an aqueous dispersion of said mineral with a member selected from the group consisting of: (i) an aqueous solution of ions selected from the group consisting of lithium ions, aluminum ions, and ions of an element having an atomic number of 21-32, 39-51, or 57-83; and (ii) an aqueous solution or an aqueous suspension of at least one organic quaternary ammonium compound having the formula wherein R, R', R", and R''', are organic radicals selected from the group consisting of aliphatic radicals having 1-20 carbon atoms, A is an anion selected from the group consisting of chloride, bromide, fluoride, iodide, acetate, hydroxide, phosphate, and sulfate; and $y$ is an integer equal to, but opposite in sign to the oxidation number of said anion A, said sheet of mineral filler material having a first surface, a second surface, and a thickness of about 0.1-3 mil, in surface-to-surface contact with a surface of a first sheet of flexible thermoplastic film, said film consisting essentially of a polymer selected from the group consisting of polyethylene and a blend of about 90-10 parts of polyethylene and about 10-90 parts of a copolymer of about 55-85 parts of ethylene and about 45–15 parts of vinyl acetate, said film having a thickness of about 1–5 mils;
  b. while said sheets are in such contact placing the second surface of said sheet of said modified mineral filler material in surface-to-surface contact with a surface of a second sheet of flexible thermoplastic film selected from the group consisting of: (i) a blend of about 10–90 parts polyethylene and about 90–10 parts of a copolymer of about 55–85 parts of ethylene and about 45–15 parts of vinyl acetate; (ii) a blend of about 10–90 parts of polyethylene and about 90–10 parts of a copolymer of about 80 parts of ethylene and about 20 parts of ethyl acrylate; (iii) a copolymer of about 80–90 parts ethylene, about 5–10 parts zinc methacrylate, and about 4–10 parts of methacrylic acid, (iv) a copolymer of about 15–10 parts ethylene and about 85–90 parts vinyl acetate; (v) low molecular weight atactic polypropylene; (vi) a copolymer of about 55–85 parts of ethylene and about 45–15 parts of vinyl acetate; and (vii) low density polyethylene, said second film having two surfaces and a thickness of about 0.5–5 mils, to form a sandwich comprising said sheet of modified mineral filler material between the first and second sheets of flexible thermoplastic film the first surface of said sheet of said modified mineral filler material being in face-to-face contact with a surface of the first sheet of flexible thermoplastic film and the second surface of said sheet of modified mineral filler material being in face-to-face contact with a surface of the second sheet of flexible thermoplastic film;
  c. compressing the sandwich for about 5–120 seconds under a pressure of about 100–500 psig. while heating said sandwich at a temperature above the softening point of said thermoplastic films to bond the surfaces of said thermoplastic films to the surface of modified mineral filler material;
  d. releasing the pressure; and
  e. recovering the thus formed laminate.

5. A process for preparing a self-supporting flexible laminate useful for packaging materials, comprising:
  a. applying at least one coating of a dispersion of a mineral filler material, said dispersion containing about 0.1–10 percent of a mineral filler material selected from the group consisting of vermiculite, mica, talc, and clay having an axial ratio of about 20–300:1, said mineral filler having been modified by a process comprising contacting an aqueous dispersion of said mineral with a member selected from the group consisting of: (i) an aqueous solution of ions selected from the group consisting of lithium ions, aluminum ions, and ions of an element having an atomic number of 21–32, 39–51, or 57–83; and (ii) an aqueous solution or an aqueous suspension of at least one organic quaternary ammonium compound having the formula wherein R, R', R'', and R''', are organic radicals selected from the group consisting of aliphatic radicals having 1–20 carbon atoms, A is an anion selected from the group consisting of chloride, bromide, fluoride, iodide, acetate, hydroxide, phosphate, and sulfate; and $y$ is an integer equal to, but opposite in sign to the oxidation number of said anion A, to a surface of a substrate comprising a first sheet of a first flexible thermoplastic film consisting essentially of a blend of about 10–90 parts of polyethylene and about 90–10 parts of a copolymer of about 80 parts ethylene and about 20 parts acrylic acid, said film having a thickness of about 1–5 mils;
  b. adjusting the thickness of said coating to such thickness that, when subjected to a later-recited drying step, the coating will form a layer of said modified mineral filler material having a thickness of about 0.01–0.08 mil;
  c. drying said coating to form a layer of said modified mineral filler material, said layer adhering to the surface of the substrate, said layer having one exposed surface and a thickness of about 0.01–0.08 mil;
  d. placing a surface of a second sheet of a second flexible thermoplastic film selected from the group consisting of; (i) a blend of a but 10–90 parts polyethylene and about 90–10 parts of a copolymer of about 55–85 parts of ethylene and about 45–15 parts of vinyl acetate; (ii) a blend of about 10–90 parts of polyethylene and about 90–10 parts of a copolymer of about 80 parts of ethylene and about 20 parts of ethyl acrylate; (iii) a copolymer of about 80–90 parts ethylene, about 5–10 parts zinc methacrylate, and about 4–10 parts of methacrylic acid; (iv) a copolymer of about 15–10 parts ethylene and about 85–90 parts vinyl acetate; (v) low molecular weight atactic polypropylene; (vi) a copolymer of about 55–85 parts of ethylene and about 45–15 parts of vinyl acetate; and (vii) low density polyethylene, said second film having two surfaces and a thickness of about 0.5–5 mils, said sheet of second thermoplastic film having a thickness of about 1–5 mils in surface-to-surface contact with the exposed surface of said layer of modified mineral filler material to form a sandwich comprising the layer of modified mineral between the first and second sheets of flexible thermoplastic film;
  e. compressing the sandwich for about 5–120 seconds under a pressure of about 100–500 psig. and heating said sandwich at a temperature above the softening point of the flexible thermoplastic film while maintaining said sandwich under said pressure to bond said thermoplastic films to the surfaces of said mineral filler material;
  f. releasing the pressure; and
  g. recovering the thus formed laminate.

* * * * *